No. 613,595. Patented Nov. 1, 1898.
A. PAINTER.
APPARATUS FOR LOADING MOVABLE CARRIERS.
(Application filed Nov. 17, 1896.)
(No Model.) 2 Sheets—Sheet 1.
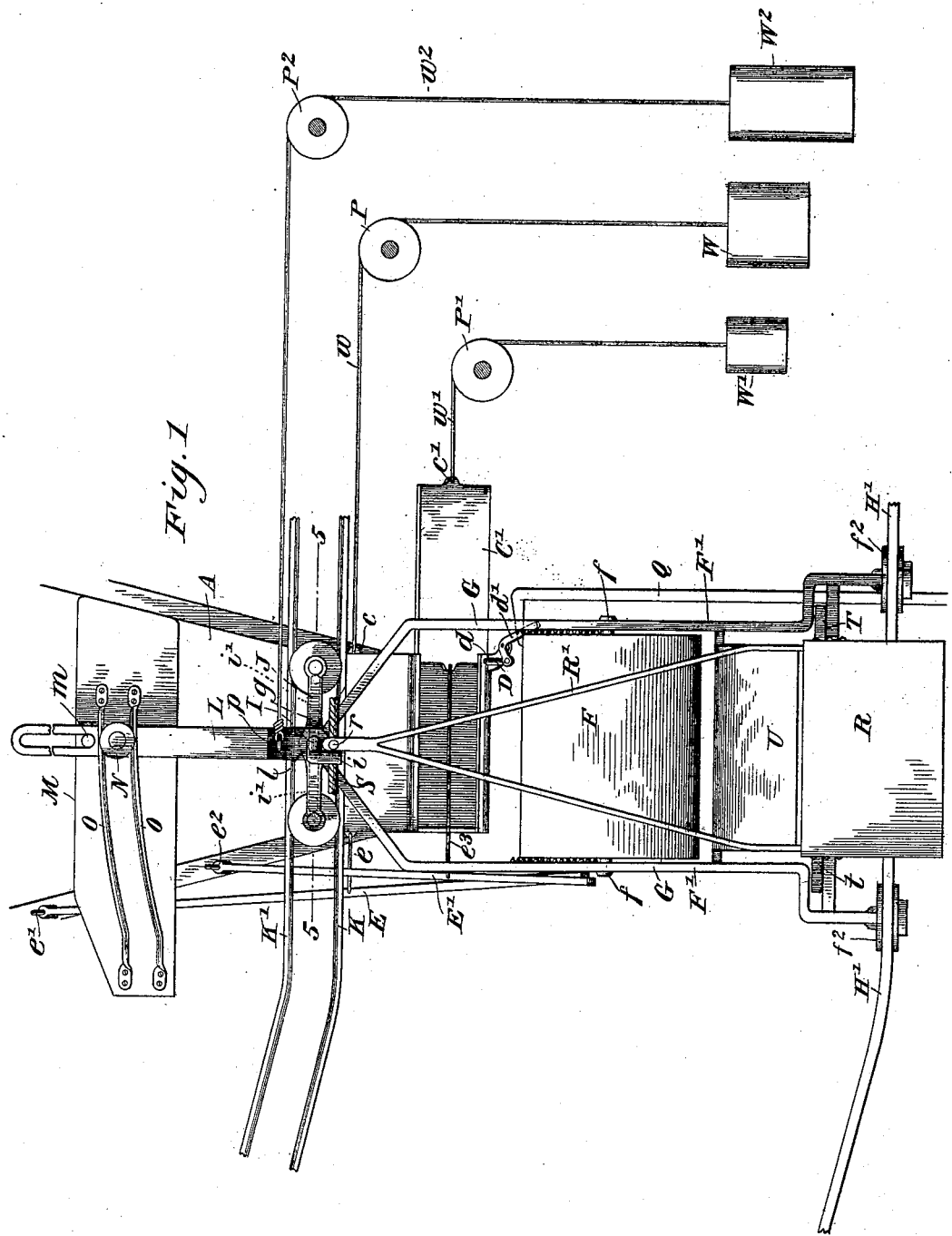
Witnesses
Inventor
Arthur Painter.
By his Attorneys

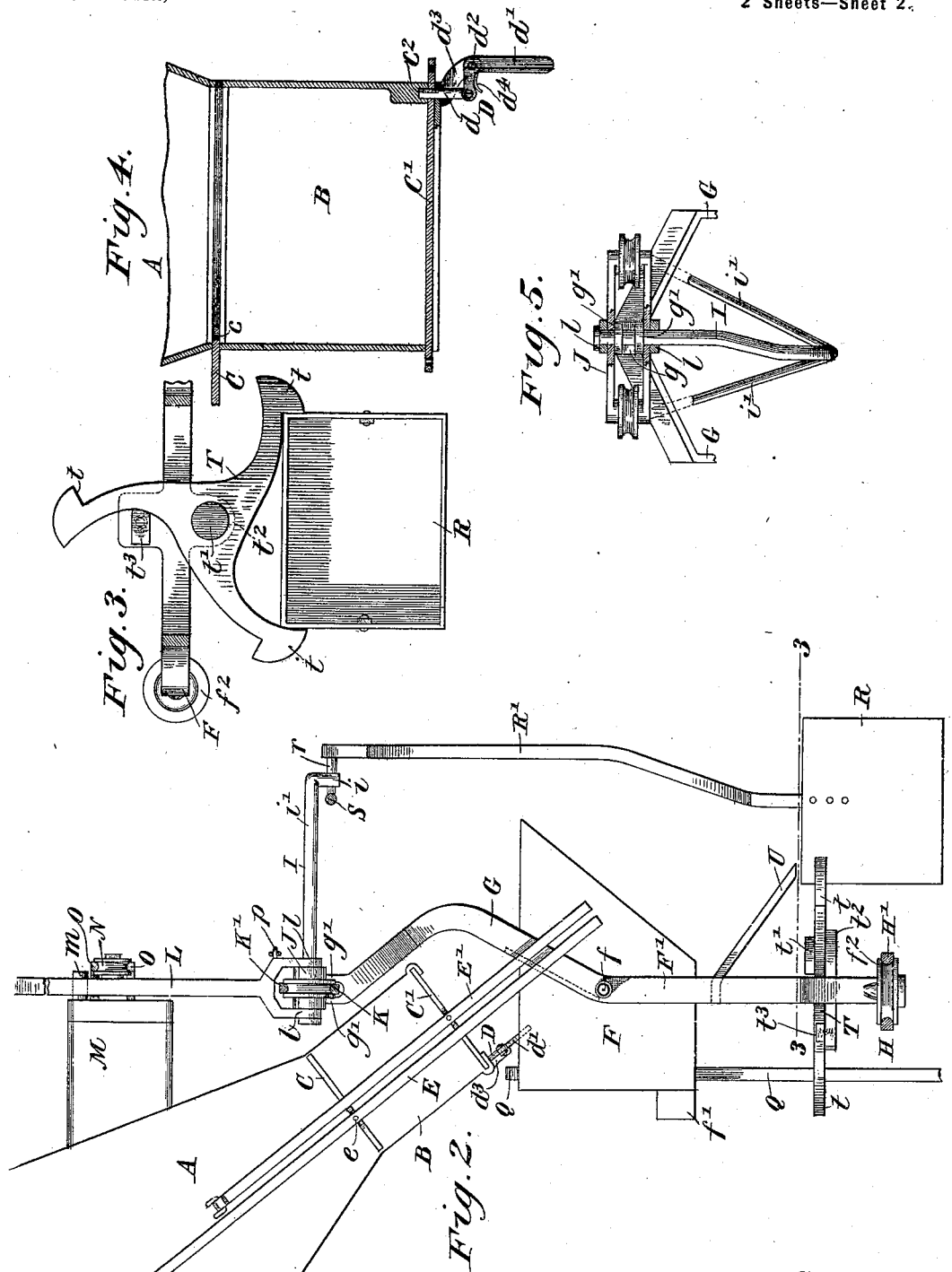

UNITED STATES PATENT OFFICE.

ARTHUR PAINTER, OF NELSON, CANADA, ASSIGNOR TO H. M. BARSTOW, OF NAPA, CALIFORNIA.

APPARATUS FOR LOADING MOVABLE CARRIERS.

SPECIFICATION forming part of Letters Patent No. 613,595, dated November 1, 1898.

Application filed November 17, 1896. Serial No. 612,522. (No model.)

*To all whom it may concern:*

Be it known that I, ARTHUR PAINTER, a citizen of the United States, residing at Nelson, British Columbia, Canada, have invented certain new and useful Improvements in Apparatus for Loading Movable Carriers, of which the following is a specification.

The object of my invention is to provide improved apparatus for loading traveling carriers for transporting ore from place to place. Such apparatus should not be complicated, but should be as far as possible automatic. The apparatus which I have perfected is not only simple, but it is entirely automatic, the apparatus for feeding or supplying the traveling carriers being operated by the traveling carriers as they arrive.

In the accompanying drawings, Figure 1 is a front elevation of so much of the apparatus as is necessary to illustrate my invention. Fig. 2 is a side elevation of the same. Fig. 3 is a detail view in section on the line 3 3 of Fig. 2. Fig. 4 is a detail view in section, showing the arrangement of the gates in the feed-hopper. Fig. 5 shows a transverse section on the line 5 5 of Fig. 1.

The hopper A is preferably inclined, as shown. At its lower end it has a chamber B of definite size, at each end of which there is a gate. The upper gate C is held normally closed by a weight W, attached to a rope $w$, passing over a pulley P and attached at $c$ to the gate. The lower gate C' is held normally open by a weight W', attached to a rope $w'$, which passes over a pulley P' and is attached at $c'$ to the gate. When the gate C' is closed, it is held closed by a catch D. (Shown on a large scale in Fig. 4.) This catch consists of a bolt-rod $d$, which extends through a perforation in the gate and into a socket $c^2$ in the wall of the chamber B. The bolt-rod is attached to the smaller arm of a bell-crank lever $d'$, pivoted at $d^2$ to a bracket $d^3$, extending from the hopper. A spring $d^4$ tends to shoot the bolt home to lock the gate in place. The gate C is connected by a rope or other suitable connection $e$ to a bar E, pivoted at $e'$ to the hopper and extending downward into the path of the hangers of the loading-bucket, hereinafter described. A rod E', pivoted at $e^2$, is similarly arranged and is connected by a rope or other suitable connection $e^3$ with the gate C'. The manner of operating the gates will be explained farther on.

A loading-bucket F, arranged below the lower end or mouth of the hopper, is pivoted at $f$ to a bifurcated frame G. The loading-bucket is weighted at $f'$, and when emptied the bucket will occupy the position shown in Fig. 2. The bifurcated frame G extends both above and below the bucket. On each side the downwardly-extending arms F' of the frame are provided with grooved rollers $f^2$, which ride between parallel rails H H'. The arms of the frame G are parallel for some distance above the loading-bucket and then inclined toward each other and meet at $g$, as shown in detail in Fig. 5.

The upper end of the frame is provided with brackets $g'$ to receive a connecting-arm I, braced by rods $i'$, which projects into the path of the traveling buckets, as shown in Fig. 2. A small trolley-carriage J is attached to the frame G and travels between rails K K', which are horizontal and parallel for some distance and then are inclined, as clearly shown in Fig. 1. The trolley-wheels closely fit the rails and the carriage has no vertical movement between the rails, but has a slight vertical movement when it ascends the incline.

A bar L, bifurcated at its lower end $l$ and attached to the frame G, has a slot-and-pin connection $m$ with a bracket M, projecting from the hopper A. This frame carries a grooved roller N, which rides between two curved rails O. When the carriage J moves to the left, as viewed in Fig. 1, the bar L at its lower end follows the movement of the carriage, but the pin $m$ holds the upper end of the bar. The slot, however, permits the carriage to move forward; but when the pin $m$ has reached the end of the slot no further movement of the carriage is permitted. In like manner when the carriage returns and the bar L assumes a vertical position, as shown in Fig. 1, the pin $m$ will be located at the bottom of the slot. As will be hereinafter described, the carriage is guided by the rails K K' first in a horizontal direction and then in an upwardly-inclined direction in order to release the loading-bucket. The apparatus would work without the use of the bar L; but I prefer to use this bar in order to limit the movement of the carriage and to aid in guiding it. The rails O are so shaped as to properly guide the carriage, and the top rail K' might be omitted; but I find the most satisfactory results are obtained when the carriage is guided both by the rails K K' and by the rails O O and the bar L.

When the loading-bucket is beneath the hopper, it is held upright by means of a hook Q. (Shown clearly in Fig. 1.) The traveling carrier R is suspended by a hanger R', provided with an arm $r$ from the endless carrier or cable S. (Shown in cross-section in Fig. 2.) The cable moves continuously, and as each bucket approaches the hopper the arm $r$ acts upon the downturned arm $i$ of the connecting-arm I to operate the mechanism for delivering the contents of the loading-bucket to the carrier R.

It will be observed that the rails K K', between which the carriage J moves, are horizontal throughout a portion of their length and are inclined upwardly at one end, as shown in Fig. 1. The object of inclining the rails is to release the carriage from the arm $r$ of the traveling bucket at the proper time. When the carriage is traveling between the parallel portions of the rails, the arm $r$ engages the arm $i$; but when the carriage ascends the inclined portion of the rails the arm $i$ is lifted above the arm $r$, the traveling bucket R continues on its journey, released from the carriage, and the carriage is returned to its original position by means of the weight $W^2$.

In order to hold the bucket R steady, I provide a rotary catch. (Shown more particularly in Figs. 2 and 3.) It consists of a three-armed frame T, provided with three hooks $t$, adapted to engage the corners of the buckets. The frame is pivoted at $t'$ to a supporting-frame $t^2$, carrying a spring-catch $t^3$, which allows the rotary frame to move in one direction, but prevents it from moving backward. The supporting-frame is attached to the bars F' below the loading-bucket F. An inclined board U acts as a rest for the loading-bucket when it is tilted, and it also acts as a chute.

It will be understood that the bucket R moves forward in substantially a straight line, while the catch T moves forward for a short distance together with the bucket R; but it also has a rotary movement. When a bucket first comes into contact with the catch, its front end strikes the rear end of one of the teeth $t$, and as the bucket moves forward the catch is rotated one-third of a revolution until the front end of the next tooth engages the rear end of the bucket. The bucket will then be held between two teeth, as shown in Fig. 3, and will occupy this position while the bucket and catch move forward together.

As soon, however, as the catch has reached the limit of its movement forward the bucket R will press more forcibly against the tooth $t$ in front of it and will rotate the catch, causing the tooth in front of it to be separated. The bucket can then proceed on its way, leaving the catch to return with the frame to which it is attached. The next succeeding bucket engages the catch in the same way as above described.

Fig. 1 shows the position of the several parts of the apparatus when a loading-bucket is being filled, the gate C' being open and the gate C being closed. A measured quantity is delivered from the chamber B of the feed-hopper to the bucket. It will be understood that the traveling bucket or carrier R does not stop, but travels on at a uniform rate. The arm $r$ engages with the arm $i$ of the connecting-arm I and causes this arm, the trolley, and the parts connected therewith, including the loading-bucket, to move onward or to the left, as viewed in Fig. 1. Just after the loading-bucket commences to move it is disengaged from the hook Q and will then tilt, and the ore will be delivered to the carrying-bucket while the carrying-bucket and the loading-bucket are moving. They continue to move for a sufficient distance or for a sufficient length of time to cause the contents of the loading-bucket to be delivered to the carrying-bucket, and then the trolley, the loading-bucket, &c., will be returned by means of the weight $W^2$, attached to a rope $w^2$, passing over a pulley $P^2$, and connected at $p$ to the bar L just above the trolley. When moving to the left, the frame G will abut against the rods E and E', causing the gate C to be opened and the gate C' to be closed as these arms are moved outwardly, and through the connections $e$ and $e^3$ will open and close the gates properly. On the return movement, or that to the right, the weight W will cause the gate C to close and the weight W' will tend to open the gate C'; but this gate cannot open, as it is held by the latch D; but when the bucket has arrived at the limit of its return movement to the right the latch will be tripped, as indicated in Fig. 1, and the gate C' will open and deliver its contents to the loading-bucket, which is in position beneath it. This bucket being thus charged is now ready to deliver its contents to a carrying-bucket as soon as one arrives. It will thus be seen that the chamber B is filled from time to time and is emptied at proper times to fill the loading-bucket, so as to hold it in readiness to supply traveling buckets as they pass by the apparatus.

It will be observed that when the bucket F is at rest the gate C is closed and no ore can pass from the bin into the bucket after it has been once filled. When the bucket F commences to move to the left, the gate C commences to open, and continues to open gradually as the bucket F moves to the left. At the same time the gate C' gradually closes. It is true that some of the ore that passes by the gate C during the movement of the bucket F to the left may pass through the chamber B into the bucket; but by the time the bucket F has passed by the end of the bin the gate C' is completely closed and there is therefore no waste of material. It will also be observed that as soon as the bucket F has passed by the bin the gate C' is not only closed but is locked. On the return movement of the bucket the gate C' is closed gradually, the ore in the meantime falling down into the chamber B, which becomes filled before the bucket has reached the limit of its movement to the right, at which time the gate C' closes, and at the same time the catch D is tripped, the gate C' flies open, and the contents of the chamber B are delivered to the loading-bucket. The loading-bucket is shaped as shown in Fig. 2. The weight $f'$ holds the bucket in an upright position when it is empty; but when the bucket is filled this weight is overbalanced and the bucket tilts and delivers the material down over the incline U into the traveling carrier R.

I find it desirable to employ the rotary catch shown in Fig. 3, although it might be dispensed with. This catch holds the traveling carrier R steady in position directly below the loading-bucket F. If the carrier were left free to swing, it would sometimes not be in proper position and the material might be spilled; but by my improvements when the traveling carrier R arrives at the catch it is caught by the hooked ends $t$ and held steady, as indicated in Fig. 3. When ready to pass by the loading-bucket, the carrier readily turns the catch and leaves it ready to connect with the next traveling bucket.

The apparatus is entirely automatic, it being only necessary to keep the hopper or bin well supplied with ore. The apparatus may be modified without departing from my invention. Mechanical equivalents may of course be substituted for the weights and for other parts of the apparatus. If preferred, the upper gate may be worked by hand instead of automatically. The rope $w^2$ may be geared to return the loading-bucket slowly, and the rods E E' may be of such length or leverage as to operate the gates in such manner as to prevent the waste of ore.

I claim as my invention—

1. Apparatus for loading traveling buckets, comprising a feed-hopper, a loading-bucket adapted to travel back and forth in front of the feed-hopper, a traveling bucket or carrier, means for causing the loading-bucket to travel with the carrying-bucket as it arrives at and passes the feed-hopper, means for causing the loading-bucket to discharge its contents into the traveling bucket while it is moving with it, means for causing the loading-bucket to move backward to its position under the feed-hopper immediately after having discharged its contents into the traveling bucket, a sliding gate in the feed-hopper, a weight tending to open the gate, and a connection between the gate and the loading-bucket for closing it.

2. An apparatus for loading traveling buckets, comprising a hopper having two gates, one of which is closed when the other is open, a traveling loading-bucket, and means for opening and closing the gates as the bucket is moved.

3. An apparatus for loading traveling buckets, comprising a hopper having two gates at opposite ends of a measuring-chamber, one of which is closed when the other is open, a weight for opening one gate, a weight for closing the other gate, a traveling loading-bucket, rods connected with the gates, and operated by the traveling loading-bucket, to open and close the gates of the measuring-chamber.

4. An apparatus for loading traveling buckets comprising a hopper having a gate at its lower end, a weight for opening the gate, a catch for holding the gate closed against the force of the weight, a traveling loading-bucket which opens the catch and connections between the traveling bucket and the gate for closing this gate when the loading-bucket moves in one direction.

5. An apparatus for loading traveling buckets, comprising a loading-bucket, a frame in which it is suspended, a carriage secured to the upper end of the frame, rails below the bucket in which rollers attached to the frame move, an arm projecting from the carriage and adapted to be engaged by the traveling carrier-bucket, upper and lower rails between which the carriage moves and which are horizontal throughout part of their length and inclined upwardly at one end to cause the arm which projects from the frame to be freed from the traveling carrier-bucket.

6. An apparatus for loading traveling buckets comprising a hopper, a loading-bucket, means for supporting and guiding it, a connecting-arm projecting from the suspending-frame of the loading-bucket and adapted to engage with the frame of the traveling carrying-bucket, and a pivoted frame having hooks to engage with the traveling carrying-bucket for the purpose specified.

7. In an apparatus for loading traveling buckets, the combination of the loading-bucket, the bifurcated frame in which it is pivoted, a suspending-bar attached to the upper end of the frame, the hopper, a bracket or projection thereon, a slot-and-pin connection between this bracket and the bar, a roller carried by the bar, and rails for guiding it.

8. An apparatus for loading traveling buckets comprising a feed-hopper having a measuring-chamber at its lower end, gates at opposite ends of the measuring-chamber, means for opening and closing them, a loading-bucket, a frame in which it is pivoted, a trolley at the upper end of the frame, rails having an inclined portion and between which the trolley-wheels move, guide-rollers at the lower end of the frame, rails having an inclined portion and between which the guide-rollers move, means for locking one of the gates, and means for holding the loading-bucket in position while being loaded.

In testimony whereof I have hereunto subscribed my name.

ARTHUR PAINTER.

Witnesses:
A. M. JOHNSON,
JOHN A. KIRKPATRICK.